United States Patent [19]

Wesselski

[11] Patent Number: 4,736,490
[45] Date of Patent: Apr. 12, 1988

[54] LOCKING HINGE

[75] Inventor: Clarence J. Wesselski, Alvin, Tex.

[73] Assignee: The United State of America as represented by the Administrator of the National Aeronautics and Space Administration, Washington, D.C.

[21] Appl. No.: 924,397

[22] Filed: Oct. 29, 1986

[51] Int. Cl.[4] .................. E05F 1/12; E05D 11/10
[52] U.S. Cl. ........................... 16/292; 16/297;
16/326; 16/332; 16/345; 16/347; 16/349
[58] Field of Search ............ 16/291, 292, 293, 296,
16/297, 324, 326, 333, 347, 348, 345, 349, 361

[56] References Cited

U.S. PATENT DOCUMENTS

| 1,712,867 | 5/1929 | Beil . | |
|---|---|---|---|
| 1,798,163 | 3/1931 | Krenzke . | |
| 2,133,692 | 10/1938 | Gittings | 5/82 |
| 3,187,373 | 6/1965 | Fisher | 16/144 |
| 3,883,157 | 5/1975 | Simpkins | 280/287 |
| 4,111,217 | 9/1978 | Victor | 135/15 |
| 4,393,541 | 7/1983 | Hujsak | 16/297 |
| 4,532,674 | 8/1985 | Tobey | 16/295 |
| 4,543,006 | 9/1985 | Wang | 403/93 |

Primary Examiner—Nicholas P. Godici
Assistant Examiner—Edward Brown
Attorney, Agent, or Firm—Hardie R. Barr; John R. Manning; Edward K. Fein

[57] ABSTRACT

A bracket hinge and bracket members (10, 10') with a spring biased and movable locking member (30). The locking or latch member (30) has ear parts (38, 39) received in locking openings (25, 25') where wedging surfaces (40, 41) on the ear parts cooperate with complimentary surfaces (42, 42') on the bracket members for bringing the bracket members into a tight end-to-end alignment when the bracket members are in an extended position. When the locking member (30) is moved to an unlocking position, pivoting of the hinge about a pivot pin (32) automatically places locking pins (70, 71) in a circular shaped groove (55) on the locking member (30) to retain the locking member (30) in an unlocked position. In pivoting the hinge from an extended position to a folded position, longitudinal spring members (80, 81) are placed under tension over annular rollers (60, 61) so that the spring tension in a folded position assists in return of the hinge from a folded position to an extended position.

9 Claims, 3 Drawing Sheets

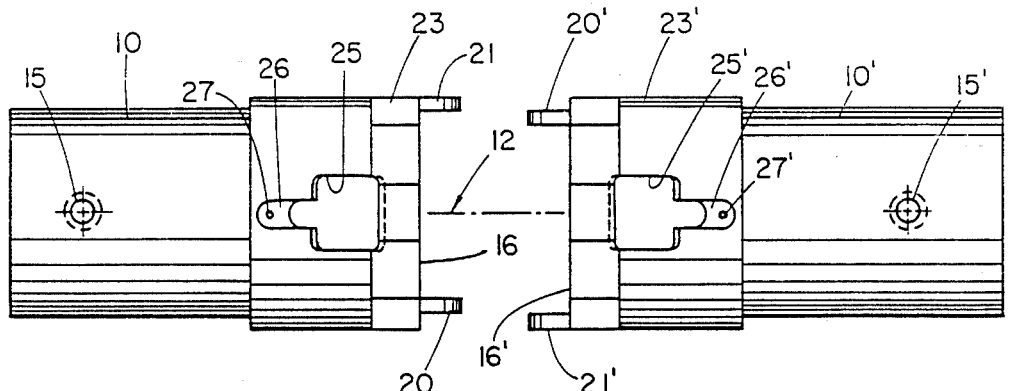
FIG. 1A  FIG. 1B
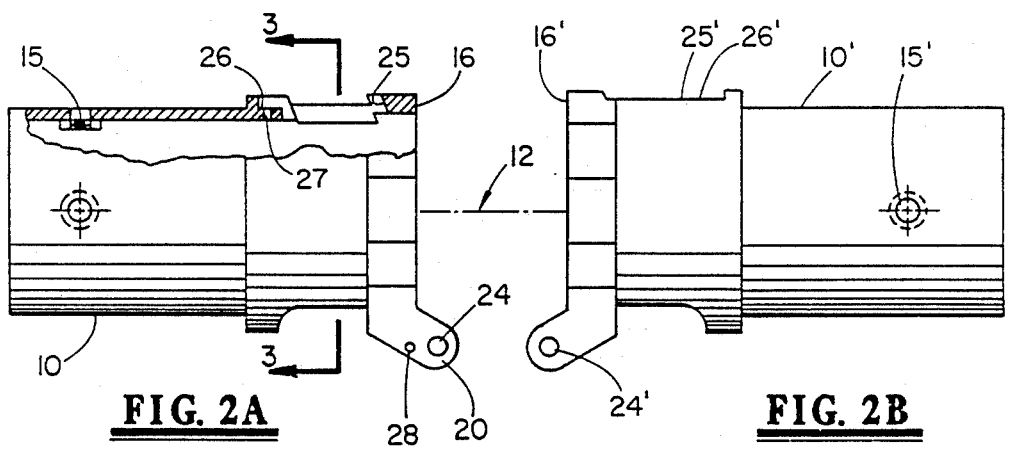
FIG. 2A  FIG. 2B
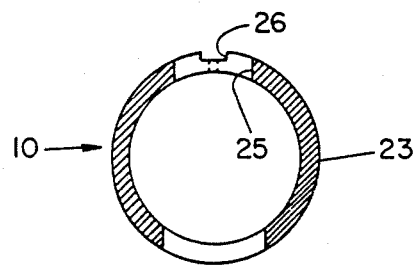
FIG. 3

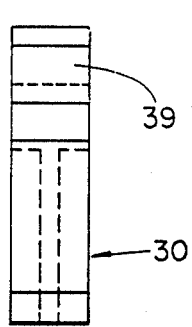
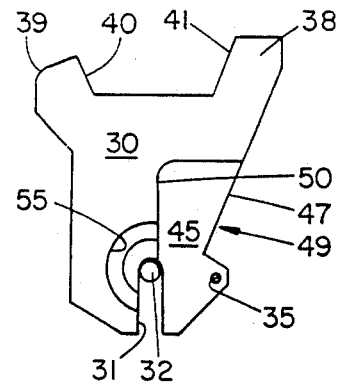
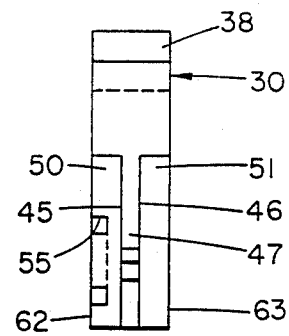
FIG. 6  FIG. 7  FIG. 8
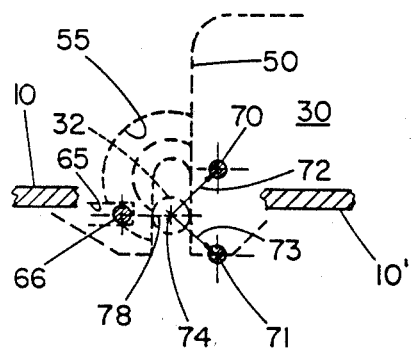
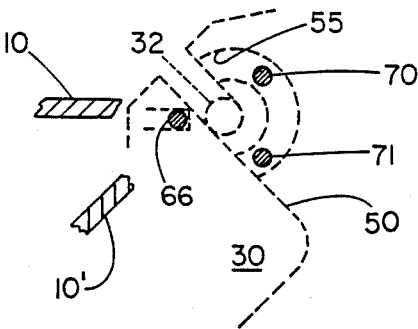
FIG. 9  FIG. 10
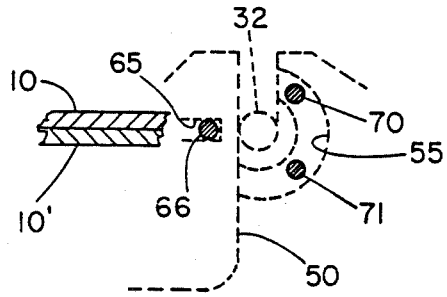
FIG. 11

LOCKING HINGE

ORIGIN OF THE INVENTION

The invention described herein was made by an employee of the United States Government and may be manufactured and used by or for the Government of the United States of America for Governmental purposes without the payment of any royalties thereon or therefore.

DESCRIPTION

1. Technical Field

This invention relates to a folding bracket hinge structure and more particularly, to a hinge which pivotally connects two structural members where a locking member in the hinge operates to automatically lock the hinge in an extended position and where the locking member can be automatically locked in a disengaged or unlocked condition to allow the structural members to be moved to a folded condition and where a spring means is tensioned in a folded condition of the hinge to facilitate return of the hinge to an extended condition.

2. Background Art

The prior art, U.S. Pat. Nos. 1,798,163; 3,187,373; and 4,111,217 disclose a similar type of bracket assembly where a locking member releasably locks two pivotally connected bracket members in axial alignment. However, none of these patents disclose locking lug fingers which have inclined facing surfaces for engaging complimentarily inclined surfaces on the bracket members with a wedging action for assuring that the two bracket members are held in intimate face to face contact. Also, the patents disclose compression springs to keep the locking member in a locking position where it remains unless depressed manually or by the act of unfolding the hinge. None of these hinges include tension springs for aiding in return of the hinge from a folded position to an extended position, and none of these patents provide a lock to maintain the locking member in an unlocked position while moving between a folded and extended position of the bracket members.

U.S. Pat. No. 4,393,541 discloses a complex spring and cable assembly for aiding in the return of a hinge from a folded position to an extended position. Locking or disabling the latch member in this hinge requires four pins rather than use of the latch member itself thus greatly increasing the complexity of the hinge. Further, no means are provided for assuring that the facing surfaces of a hinge remain in intimate contact.

THE PRESENT INVENTION

In accordance with the present invention, a locking hinge has pivotally connected bracket members that are locked in an extended end to end relationship for providing a rigid connection of the locking hinge. A movable latch or locking member in one of the bracket members is spring biased toward a locking position with both bracket members. The locking hinge uses a wedge function between the locking member and the bracket members to provide a positive end to end contact of the bracket members. When the locking member is moved to an unlocking position, pivoting of the locking hinge automatically locks the locking member in an unlocking position. Spring members connected between the bracket members are placed in tension by pivoting of the locking hinge to a folded position. The tensioned springs then facilitate and assist return of the locking hinge from a folded position to an extended position.

These features combine to create a locking hinge which allows compact storage and easy assembly of structural members even under adverse conditions.

Another improvement is the minimal number of parts required and the mirror image construction of the bracket members to minimize the cost of manufacture and interchangeability of the bracket members.

BRIEF DESCRIPTION OF DRAWINGS

FIG. 1A and FIG. 1B are plan or top views of the bracket members shown in an end to end or extended relationship and in an unassembled condition;

FIG. 2A and FIG. 2B are views in side elevation of the bracket members of FIG. 1A and 1B and in partial cross-section of the bracket member shown in FIG. 1A;

FIG. 3 is a cross-sectional view taken along line 3—3 of FIG. 2A;

FIG. 6 is one end view of the locking member;

FIG. 7 is a side view of the locking member;

FIG. 8 is the other end view of the locking member;

FIG. 9 is a phantom line detail of a portion of the locking member in relation to locking pins with the hinge in an extended position;

FIG. 10 is a schematic view of the locking member in an unlocking position and a bracket member rotated approximately 135° counter clockwise for illustrating the operation of the locking pins relative to the locking member in a rotational position of the hinge; and FIG. 11 is a schematic view of the locking member in an unlocking position and a bracket member fully rotated to a folded position for illustrating the operation of the locking pins relative to the locking member in a folded hinge position.

BEST MODE FOR CARRYING OUT THE INVENTION

Figure 4:
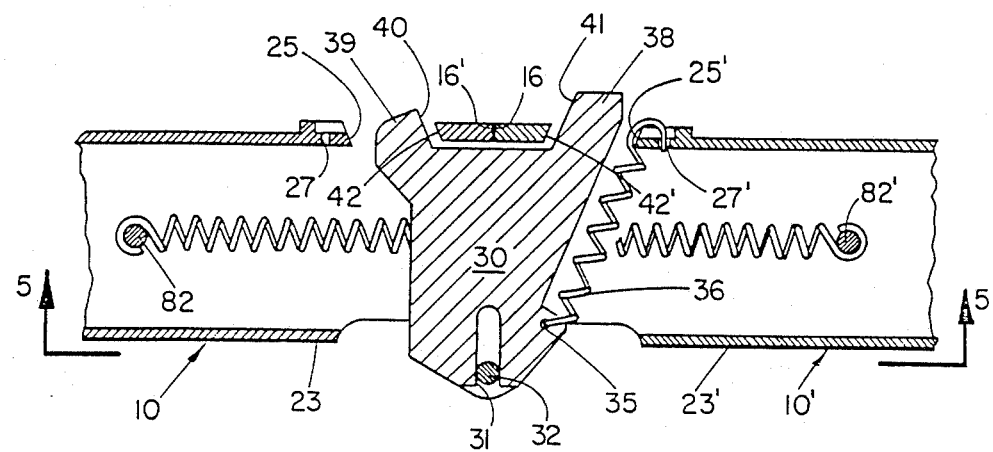
FIG. 4 is a cross-sectional view of assembled bracket members taken along line 4—4 of FIG. 5.

In the explanation to follow, reference will be made to vertical and horizontal relationships as well as top, bottom, end or sides which are made with respect to the drawing illustrations for ease of explanation and description.

Referring now to FIG. 1A and FIG. 1B, a tubular housing or bracket member 10 is shown in an end-to-end relationship with respect to a mirror image housing or bracket member 10'. The housing or bracket members 10 and 10' have a common central axis 12 in the position shown in FIG. 1A and FIG. 1B. Intermediate of the length of each of the housing members 10, 10' are circumferentially disposed threaded openings 15, 15'. Cylindrically shaped support or structural members (not shown) can be inserted into the outer end of the housing members and secured in place by threaded bolts in the threaded openings 15, 15'. The inner end surfaces 16, 16' of the housing members 10, 10' lie in vertical planes transverse to the central axis 12 and permit an end-to-end abutment of the housing members 10, 10' in the extended position.

Each bracket member 10, 10' has spaced apart pivot lugs or ears 20, 21 and 20', 21' which are parallel to one another and generally extend outwardly from the circumference of a bracket member and outwardly from an end surface 16 or 16'. An outer ear 21 or 21' has a tangential relationship relative to an outer circumferential surface 23 or 23' of a bracket member 10 or 10' while an inner ear 20 or 20' is offset inwardly of a tangential plane to the circumference of the bracket member 10 or 10' by a distance slightly more than the thickness of an outer ear 21 or 21'. Thus, when the bracket members 10 and 10' are in an end-to-end abutting relationship, the inner and outer ears 20', 21' and 20, 21 of adjacent bracket members 10, 10' overlap one another when the surfaces 16 and 16' contact one another. The ears 20, 21 and 20', 21' have aligned pivot openings 24, 24' which receive a pivot pin 32 (FIG. 5) which is suitably retained in position to pivotally connect the bracket members 10, 10' to one another. The central axis of the pivot openings 24, 24' and the pivot axis for the pivot pin 32 are co-extensive with one another and are at a 90° angle with respect to the central axis 12. The pivot axis for the pivot pin 32 also lies on a tangential plane to the outer circumferential surface 23, 23' of the bracket members. The location of the pivot axis for the pivot pin 32 permits the outer surfaces of the bracket members 10, 10' to be adjacent in a side by side relationship to one another when the bracket members 10, 10' are in a collapsed or folded position. In a collapsed or folded position, the end surfaces 16, 16' of the bracket members 10, 10' lie in a common transverse plane to the central axis 12.

The upper wall of each bracket member 10, 10' (on an opposite side from the ears 20, 21) has locking openings 25, 25' which are generally rectangularly shaped (See FIGS. 1, 2 and 3). At the far end of each locking opening 25, 25' in a direction away from the end surfaces 16, 16' is an outer recess 26, 26' in the wall surface with a spring opening 27 (FIG. 2A). A recess 26 or 26' and a spring opening 27 can accommodate a curled circular end of a spring member 36 (See FIG. 4).

Figure 5:
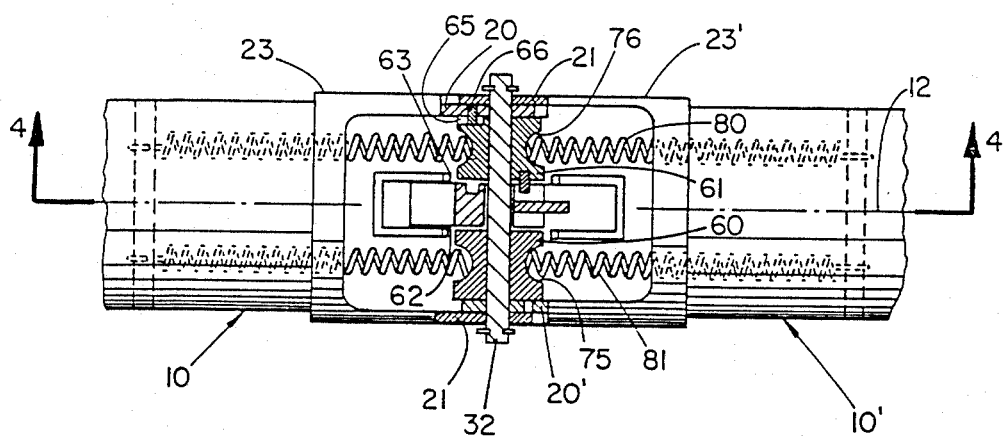
FIG. 5 is a bottom view of the assembled bracket members with a cross-section taken generally along line 5—5 of FIG. 4.

In each of the offset or inner ears 20, 20' is an offset bore 28 which can receive a locking pin 66 (FIG. 5). An offset bore 28 has a central axis aligned in a plane transverse to the central axis 12 where the plane includes the axis of the pivot pin 32.

As can be appreciated from the foregoing, the bracket housing members 10, 10' have identical configurations thus the bracket members 10, 10' are identically constructed for economy and interchange purposes.

Referring now to FIG. 4, in the bracket members 10, 10' is a movable locking member 30 formed from plate material and which is vertically disposed in respect to a vertical plane which intersects the central axis 12 of the bracket members 10, 10'. The locking member 30 has a U shaped vertical groove or slot 31 terminating in a bottom end surface. The pivot pin 32 is slidably disposed in the groove 31 so that the locking member 30 can be moved vertically relative to the pivot pin 32. On one side or end of the locking member 30 is an offset shoulder portion which has an opening 35 for receiving one end of the spring member 36. The spring member 36 when attached to the locking member 30 and to one of the housing members 10' serves to resiliently bias the locking member 30 to an upper locking position where the pivot pin 32 is near the lower open end of the groove 31.

The upper surface of the locking member 30 is shaped to form a guide or locking ear part 38 and a locking ear part 39. The ear parts 38 and 39 are spaced apart and are aligned with the locking openings 25, 25' in the bracket members 10, 10' in the extended position of the bracket members. The ear parts 39 and 38 have inclined facing surfaces 40, 41 which engage complimentary inclined surfaces 42 and 42' in the locking openings 25, 25' in the housing members 10, 10'.

As shown in FIG. 4, the facing surfaces 40, 41 have an included angle greater than zero degrees and less than 45 degrees to form outwardly inclined surfaces. The spacing between the base of the oppositely inclined facing surfaces 40, 41 is less than the spacing between the complimentary surfaces 42, 42' in the openings 25, 25' so that the effect of the spring member 36 under tension is to wedge or force the end surfaces 16, 16' of the bracket members 10, 10' toward one another which provides a firm and positive locking of the bracket members 10, 10' to one another.

Relative to the latching position as shown in FIG. 4, the guide or locking ear part 38 can be manually depressed which further tensions the spring member 36 and releases or removes the locking ear part 39 from the locking opening 25. Whereupon, the bracket members can be pivoted about the pivot pin 32 to rotate the bracket members to a collapsed or folded position.

Referring to FIGS. 6-8 for further details of the locking member 30, the locking member 30 has a recessed side surface 45, 46 on either side of a central rib section 47. Each recess side surface 45, 46 extends from an end surface 49 inwardly to a vertical surface 50, 51 which intersects a portion of the groove 31. In an outer side surface of the locking member 30 adjacent to the vertical surface 50 is a circularly formed locking groove 55 which extends about a central axis located within the groove 31 for the pivot pin 32. The circular groove 55 opens to the vertical surface 50 and to the groove 31 at locations above and below the pivot pin 32 when the locking member 30 is in a depressed position. The circular groove 55 extends through an angle of about 180 degrees.

Referring now to FIG. 5, the hinge assembly further includes annular rollers 60, 61 which are located between the vertical outer side surfaces 62, 63 of the locking member 30 and the side surfaces of the inner ears 20, 20'. The rollers 60, 61 each have a central annular groove 75, 76. The rollers 60, 61 are rotatively mounted on the pivot pin 32. One of the rollers 61 has a horizontal or radial groove 65 in an outer surface which receives a lock pin 66 disposed in one of the pin openings 28, 28' (FIG. 2) in an inner ear. The lock pin 66 locks the roller 61 to the inner ear 20 so that the roller 61 will pivot about the axis of the pivot pin 32 when the bracket member 10 containing the pin 66 is rotated about the axis of the pivot pin 32.

Referring now to FIG. 5 and FIG. 9, in the extended position of the bracket members 10, 10', the roller member 61 has an inner surface with pins 70, 71 which are disposed at equal diametrical distances (shown by diameter lines 72, 73) from the central axis 74 of the roller 61 with the diametrical axes 72, 73 being at an angle of 90° with respect to one another. The pins 70, 71 are also located relative to a horizontal plane 78 through the axis of the roller member 61 with the pin 70 being at an angle of 45° above the horizontal plane and the pin 71 being at an angle of 45° below the horizontal plane (see FIG. 9). The roller pins 70, 71 in the extended position of the housing members 10, 10' bear upon the vertical surface 50 of the locking member 30 when the bracket members 10, 10' are in an extended position. When the locking member 30 is depressed, the circular groove 55 in the locking member 30 aligns with the roller pin 70. Upon rotation of one bracket member 10' relative to the other bracket member 10, (See FIG. 10) the pins 70, 71 are disposed in the groove 55 (See FIGS. 10, 11) to retain the locking member 30 in a depressed condition or position. Thus, the bracket members 10, 10' can be moved from the extended position to a collapsed or folded position while automatically disabling the locking member 30.

As shown in FIGS. 4 and 5, on either side of the locking member 30 and in alignment with the annular grooves 75, 76 are springs 80, 81 which are suitably attached to the respective bracket members at 82, 82'. When the bracket members 10, 10' are moved from an extended position to a folded position, the springs 80, 81 are tensioned by extension over the spring rollers 60, 61. The springs 80, 81, under tension, then facilitate the return of the bracket members 10, 10' from a collapsed or folded position to an extended position.

The operation is believed to be self explanatory from the foregoing discussion. Briefly, in an extended condition, the end surfaces 16, 16' of the bracket members 10, 10' are in an end-to-end abutting relationship. The locking member 30 under tension of the locking spring 36 has its ear parts 38, 39 in the locking openings 25', 25 where the inclined surfaces 40, 41 have a wedging and locking effect. The roller pins 70, 71 are out of engagement with the locking groove 55 and the return springs 80, 81 are in a relaxed position. To move the housing members 10, 10' to a collapsed or folded position, the locking member 30 is manually depressed by the operator which releases the locking ear part 39 from a locking opening 25 and aligns the locking groove 55 with the roller pins 70, 71. Rotation of one housing member 10' relative to the other member 10 displaces the roller pins 70, 71 into the locking groove 55 automatically locking the locking member in a depressed position and tensions the return springs 80, 81 about the spring rollers 60, 61.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A locking hinge assembly having first and second elongated bracket members respectively having facing end surfaces adapted to have an end to end abutting relationship when disposed along a central axis in an extended position and a side wall to side wall adjacent relationship in a folded position, pivot means for pivotally interconnecting said bracket members so that said bracket members may be moved between said extended position and said folded position, a latch member slidably disposed in one of said bracket members for movement transverse to said central axis, said latch member having a spaced apart guide ear part and a lock ear part, said bracket members respectively having a guide lock opening and a lock opening aligned for receiving said ear parts in the extended condition of said bracket members, resilient means connected to said latch member and to one bracket member for resiliently biasing said ear parts into said lock openings when the bracket members are in an extended position, means for mounting said latch member for reciprocating movement between a locked position where both ear parts engage both lock openings and an unlocked position where said lock ear part is disengaged from the lock opening for permitting rotation of said bracket members to said folded position, and means on said latch member for locking said latch member in an unlocked position in response to rotation of said bracket members.

2. The apparatus as set forth in claim 1 wherein said means on said latch member for locking includes a semicircularly formed groove in a side surface of said latch member and pin means on one of said bracket members, said groove and pin means being formed and located so said pin means are aligned with said groove when said bracket members are in an extended position and said latch member is in an unlocked position so that upon relative rotation of said bracket members, said pin means are received in said groove for retaining said latch member in an unlocked position.

3. The apparatus as set forth in claim 1 or claim 2 further including resilient means disposed lengthwise relative to said central axis and coupled to said bracket members to either side of said pivot means, said resilient means being placed under tension about said pivot means when said bracket members are moved to a folded position for facilitating return of said bracket members to an extended position.

4. The apparatus as set forth in claim 1 or claim 2 and wherein said ear parts define facing locking surfaces and said lock openings have complimentarily inclined surfaces for engagement with said facing locking surfaces, said inclined surfaces being arranged for providing a wedging action relative to each of said bracket members.

5. A locking hinge assembly having first and second elongated bracket members respectively having facing end surfaces adapted to have an end to end abutting relationship when disposed along a central axis in an extended position and a side wall to side wall adjacent relationship in a folded position, pivot means for pivotally interconnecting said bracket members so that said bracket members may be moved between said extended position and said folded position, a latch member slidably disposed in one of said bracket members for movement transverse to said central axis, said latch member having a spaced apart guide ear part and a lock ear part, said bracket members respectively having a guide lock opening and a lock opening aligned for receiving said ear parts in the extended condition of said bracket members, resilient means connected to said latch member and to one bracket member for resiliently biasing said ear parts into said lock openings when the bracket members are in an extended position, means for mounting said latch member for reciprocating movement between a locked position where both ear parts engage both lock openings and an unlocked position where said lock ear part is disengaged from the lock opening for permitting rotation of said bracket members to said folded position, and spring means with ends attached to said bracket members to either side of said pivot means and where said spring means is positioned transverse to said pivot means and is tensioned upon rotation of said bracket members from an extended position to a folded position.

6. The apparatus as set forth in claim 5 wherein said latch member has a semi-circular formed groove in its side surface and one of said bracket members has pin means, said groove and pin means being formed and located so said pin means are aligned with said groove when said bracket members are in an extended position and said latch member is in an unlocked position so that upon relative rotation of said bracket members, said pin means are received in said groove for retaining said latch member in an unlocked position.

7. A locking hinge assembly having first and second elongated bracket members respectively having facing end surfaces adapted to have an end to end abutting relationship when disposed along a central axis in an extended position and a side wall to side wall adjacent relationship in a folded position, pivot means for pivotally interconnecting said bracket members so that said bracket members may be moved between said extended position and said folded position, a latch member slidably disposed in one of said bracket members for movement transverse to said central axis, said latch member having a spaced apart guide ear part and a lock ear part, said bracket members respectively having a guide lock opening and a lock opening aligned for receiving said ear parts in the extended condition of said bracket members, said lock openings having complimentarily formed surfaces for engagement with said facing locking surfaces, resilient means connected to said latch member and to one bracket member for resiliently biasing said ear parts into said lock openings when the bracket members are in an extended position, said facing locking surfaces each having an inclination so that said ear parts provide a wedging action relative to each of said bracket members, and means for mounting said latch member for reciprocating movement between a locked position where both ear parts engage both lock openings and an unlocked position where said lock ear part is disengaged from the lock opening for permitting rotation of said bracket members to said folded position.

8. The apparatus as set forth in claim 7 wherein said latch member has a semi-circularly formed groove in its side surface and one of said bracket members has pin means, said groove and pin means being formed and located so said pin means are aligned with said groove when said bracket members are in an extended position and said latch member is in an unlocked position so that upon relative rotation of said bracket members, said pin means are received in said groove for retaining said latch member in an unlocked position.

9. The apparatus as set forth in claim 8 and further including resilient means disposed lengthwise relative to said central axis and coupled to said bracket members to either side of said pivot means, said resilient means being placed under tension about said pivot means when said bracket members are moved to a folded position for facilitating return of said bracket members to an extended position.

* * * * *